(12) United States Patent
Rao

(10) Patent No.: US 7,593,015 B2
(45) Date of Patent: Sep. 22, 2009

(54) SYSTEM AND METHOD FOR SEQUENCING MEDIA OBJECTS

(75) Inventor: Sumita Rao, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 216 days.

(21) Appl. No.: 10/713,319

(22) Filed: Nov. 14, 2003

(65) Prior Publication Data

US 2005/0104886 A1    May 19, 2005

(51) Int. Cl.
*G06T 13/00* (2006.01)
*G06T 15/70* (2006.01)
*G06T 1/60* (2006.01)

(52) U.S. Cl. .................. 345/473; 345/474; 345/475; 345/501

(58) Field of Classification Search .............. 345/473, 345/474, 475, 501
See application file for complete search history.

(56) References Cited

U.S. PATENT DOCUMENTS

| | | | | |
|---|---|---|---|---|
| 5,113,493 A | * | 5/1992 | Crosby | 345/473 |
| 5,655,117 A | * | 8/1997 | Goldberg et al. | 707/102 |
| 5,659,792 A | * | 8/1997 | Walmsley | 715/500.1 |
| 5,680,619 A | * | 10/1997 | Gudmundson et al. | 717/108 |
| 5,692,117 A | * | 11/1997 | Berend et al. | 345/475 |
| 5,745,738 A | * | 4/1998 | Ricard | 703/13 |
| 5,841,432 A | * | 11/1998 | Carmel et al. | 715/500.1 |
| 5,867,175 A | * | 2/1999 | Katzenberger et al. | 345/473 |
| 5,966,121 A | * | 10/1999 | Hubbell et al. | 715/726 |
| 5,983,190 A | * | 11/1999 | Trower et al. | 704/276 |
| 6,011,537 A | * | 1/2000 | Slotznick | 715/733 |
| 6,012,068 A | * | 1/2000 | Boezeman et al. | 707/104.1 |
| 6,081,278 A | * | 6/2000 | Chen | 345/473 |
| 6,157,392 A | * | 12/2000 | McKeeth | 345/473 |
| 6,167,562 A | * | 12/2000 | Kaneko | 717/109 |
| 6,219,069 B1 | * | 4/2001 | McKeeth | 345/473 |

(Continued)

FOREIGN PATENT DOCUMENTS

EP    1424839 A1 *  6/2004

(Continued)

OTHER PUBLICATIONS

Jonathan Chien-Liang Liu; Jenwei Hsieh; Du, D.H.C.; Meng-Jou Lin; "Performance of a storage system for supporting different video types and qualities", IEEE Journal onSelected Areas in Communications, vol. 14, Issue 7, Sep. 1996, pp. 1314-1331.*

(Continued)

*Primary Examiner*—Kee M Tung
*Assistant Examiner*—Roberta Prendergast

(57) ABSTRACT

A method of displaying a long animation is provided. The animation is defined in an animation file, which identifies a set of images that form the animation when sequentially displayed. A batch processor segments the set of images into sequential subsets, with each subset sized smaller than a maximum size. In this way, all of the images identified in a particular subset may be loaded into memory. Each subset of images is associated with a respective segment identifier, and an instruction is provided along with the images to order the subsets. In this way, a first subset of images provides for the loading of a second subset of images, thereby enabling the display of long animations.

16 Claims, 6 Drawing Sheets

U.S. PATENT DOCUMENTS

| | | | |
|---|---|---|---|
| 6,230,162 B1 | 5/2001 | Kumar et al. | |
| 6,268,864 B1* | 7/2001 | Chen et al. | 345/428 |
| 6,278,455 B1* | 8/2001 | Baker | 715/716 |
| 6,278,466 B1* | 8/2001 | Chen | 345/473 |
| 6,363,468 B1* | 3/2002 | Allison | 711/173 |
| 6,396,500 B1* | 5/2002 | Qureshi et al. | 345/473 |
| 6,426,778 B1* | 7/2002 | Valdez, Jr. | 348/461 |
| 6,435,969 B1* | 8/2002 | Tanaka et al. | 463/44 |
| 6,437,786 B1* | 8/2002 | Yasukawa | 345/474 |
| 6,476,802 B1* | 11/2002 | Rose et al. | 345/419 |
| 6,522,333 B1* | 2/2003 | Hatlelid et al. | 345/474 |
| 6,538,654 B1* | 3/2003 | Rose et al. | 345/473 |
| 6,559,845 B1* | 5/2003 | Harvill et al. | 345/473 |
| 6,563,504 B1* | 5/2003 | Rose et al. | 345/473 |
| 6,587,109 B1* | 7/2003 | Rose et al. | 345/473 |
| 6,674,437 B1* | 1/2004 | Rose et al. | 345/473 |
| 6,721,741 B1* | 4/2004 | Eyal et al. | 707/10 |
| 6,735,738 B1* | 5/2004 | Kojima | 715/500.1 |
| 6,791,556 B1* | 9/2004 | Laird | 345/543 |
| 6,990,476 B2* | 1/2006 | Wen et al. | 706/47 |
| 7,096,038 B1* | 8/2006 | Perrella | 455/557 |
| 7,170,521 B2* | 1/2007 | Chylla | 345/543 |
| 2002/0073149 A1* | 6/2002 | Young | 709/204 |
| 2002/0093507 A1* | 7/2002 | Olarig | 345/568 |
| 2002/0173360 A1* | 11/2002 | Tanaka et al. | 463/44 |
| 2003/0028590 A1* | 2/2003 | Gonzalez et al. | 709/203 |
| 2003/0063090 A1* | 4/2003 | Kraft et al. | 345/475 |
| 2003/0137516 A1* | 7/2003 | Harvill et al. | 345/473 |
| 2003/0191776 A1* | 10/2003 | Obrador | 707/104.1 |
| 2007/0005795 A1* | 1/2007 | Gonzalez | 709/232 |

FOREIGN PATENT DOCUMENTS

| | | | |
|---|---|---|---|
| JP | 06292139 A | * | 10/1994 |
| JP | 11275495 A | * | 10/1999 |
| JP | 2002/101368 A | | 5/2002 |
| KR | 2003017890 A | * | 3/2003 |
| KR | 2003/031 593 A | | 4/2003 |
| WO | WO 9602898 A1 | * | 2/1996 |
| WO | WO 9965224 A2 | * | 12/1999 |

OTHER PUBLICATIONS

Zhidong Yan; Te-Chung Yang; Kuo, C.-C.J.; "Demo of wireless multimedia transmission in mobile environments", IEEE Second Workshop on Multimedia Signal Processing, Dec. 7-9, 1998, pp. 409-414.*

Cho et al., "A flash-based multimedia interactive tutoring system for distance education of biomedical engineering students: new approach to teaching microcontroller-based systems", Proceeding of 25th Annual International Conf. Of IEEE Engineering in Medicine and Biology Society, vol. 4, Sep. 17-21, 2003, pp. 3540-3543.*

Lynch and Horton, "Web Style Guide", copyright 2002, http://www.webstyleguide.com/graphics/print/graphics.html.*

Bugaj, S., et al., "Synchronised Multimedia Integration Language", W3C Working Draft Feb. 2, 1998, XP-002275957, pp. 1-29.

Hayhoe, G.F., "From Desktop to Palmtop: Creating Usable Online Documents for Wireless and Handheld Devices", International Professional Communication Conf. Proced., Oct. 24-27, 2001, pp. 1-12.

Yoshimura, T., et al., "Content Delivery Network Architecture for Mobile Streaming Service Enabled by SMIL Modification", IEICE Transactions on Communications, Jun. 6, 2003, vol. E86-B/6, pp. 1778-1787.

* cited by examiner

SYSTEM AND METHOD FOR SEQUENCING MEDIA OBJECTS

BACKGROUND

The field of the present invention is the presentation of multimedia objects, for example, graphical animations. More particularly, the present invention relates to presenting media objects using an embedded processor system.

Many electronic devices use embedded processors. For example mobile electronic devices often include embedded processors, microprocessors, or other controllers for controlling the device and providing an interface to a user. More specifically, devices such as mobile wireless phones, personal data assistants, MP3 players, and cameras generally included embedded processors for monitoring, operating, and using these devices. Also, many consumer devices such as DVD players, CD players, stereo equipment, appliances, and motor vehicles include embedded operational controllers. These embedded controllers typically have limited processing capability, and their processing capability is preferably prioritized towards operation and monitoring functions, instead of using excessive processing power and memory to provide a complex user interface. These devices also may have limited memory, such as RAM memory, to keep costs down. In this way, the embedded processor's limited memory, limited processor power, and simple structure cooperate to make cost sensitive and reliable devices.

These embedded systems often require or benefit from a visual display interface to a user, and often have other presentation devices such as a speaker, LED panels, or other media presentation components. For example, a mobile phone may have a graphical user interface displayed on an LCD screen for providing a man-machine interface. The processor in the mobile phone is responsible for call processing, diagnostics, and support applications, so only limited processor power is generally available to operate and manage the graphical user interface. Consumers, however, are demanding more interesting and more useful interaction with their electronic devices. In one example, consumers desire a multimedia aspect to the user interface by using sound, images, graphics, animations, or movies.

One way of increasing interest and utility is by providing animations. Animations generally are a sequence of images or frames presented to the user so that the user perceives a sense of motion, activity, or movement. In this way, an animation is somewhat like a movie, however it commonly has a lower resolution and lower frame speed then a typical movie. For example, an animation may have a set of sequential frames, with each frame displayed for approximately 200 milliseconds. On electronic devices, these animations may be used to provide motion to menus, titles, displays, and other notifications. Animations may include text, symbols, characters, or other graphical images. Also, animations may be used as part of help instructions, games, and start up sequences. These animations not only provide useful information to a user, but also are beneficial to gain and hold the attention of the user, and to entertain the user. These animations are useful for making the electronic device easier to use, more interesting, and just more fun.

Animations consist of a series of sequential images, with the identification and ordering of the images typically defined in an animation file. Each of the individual image files is stored locally in the device, generally in an industry-standard graphics file. When the embedded device desires to display or play an animation, the animation file is accessed, and all the images identified in that animation file are loaded into memory so that all the images reside in memory. Due to the limited processing power in typical embedded systems, the other processes operating on the embedded system, and the timing requirements for animation display, all images are loaded into memory prior to displaying the first image. Once all images have been loaded, then the processor or other animation engine sequentially displays the images according to the sequence set in the animation file.

The user interface may also include sound, which may be played before, during, or after the animation. Also, the user interface may use static images as backgrounds to moving graphics, or may use these images as standalone media objects. With these increasingly complex multimedia user interfaces, it is challenging for an embedded system to properly order and time each media object into the desired sequence.

Since typical embedded systems have limited RAM memory, only a limited number of images may be stored in memory at one time. Accordingly, embedded devices are typically limited to showing relatively short animations, as only a limited number of images may be loaded into memory at one time. Longer animations could be used, however, this would require additional processing power and additional memory so more images could be loaded into memory. But, an increase in power or memory would increase the complexity and cost for the embedded system and the device. Even though only relatively short animations are typically used, consumers are demanding more interesting, active, and helpful user interfaces, and longer animation sequences could assist in making more useful and aesthetically pleasing displays. Accordingly, there is a need for providing a system and method to enable the sequencing and presentation of multimedia objects, such as long animations, on embedded systems having limited memory and processor capability.

SUMMARY

Briefly, the present invention provides a method for sequencing and presenting media objects, for example, a long animation. The animation is defined in an animation file, which identifies a set of images that form the animation when sequentially displayed. Media objects may also include static images, sound, and movies. A batch processor segments the set of images into sequential subsets, with each subset sized smaller than a maximum size. In this way, all of the images identified in a particular subset may be loaded into memory. Each subset of images is associated with a respective segment identifier, and an instruction is provided along with the images to order the subsets. In this way, a first subset of images provides for the loading of a second subset of images, thereby enabling the display of long animations.

In a preferred example, the method of displaying a long animation segments the long animation by generating a series of sequential segment files, with each segment file having a file identifier, a list of image files, and an action instruction. The subset of images in each segment is selected so that in the aggregate, the size of each subset is smaller than a maximum size, thereby allowing all the images in the subset to be loaded into memory. Each of the segment files, except for the last segment file, includes a callback action instruction that identifies the next segment file in sequence. More particularly, the callback instruction in the current segment indicates the file identifier for the next segment file, thereby linking the segment files into the proper sequence. As each segment file is sequentially accessed, its associated image files are loaded and displayed. In this way, a long animation is played.

Advantageously, the method of sequencing media objects operates using memory and processor configurations typical for embedded processors. This enables various types of media objects to be properly sequenced and played without the increased cost, power consumption, and space requirements for more memory or processor capability. Users are able to experience the benefits and pleasure of long animations, and device providers are able to more effectively communicate with their consumers, all without increased costs or shorter battery life. In this way, devices become more usable, more active, and more fun.

DETAILED DESCRIPTION

Figure 1:
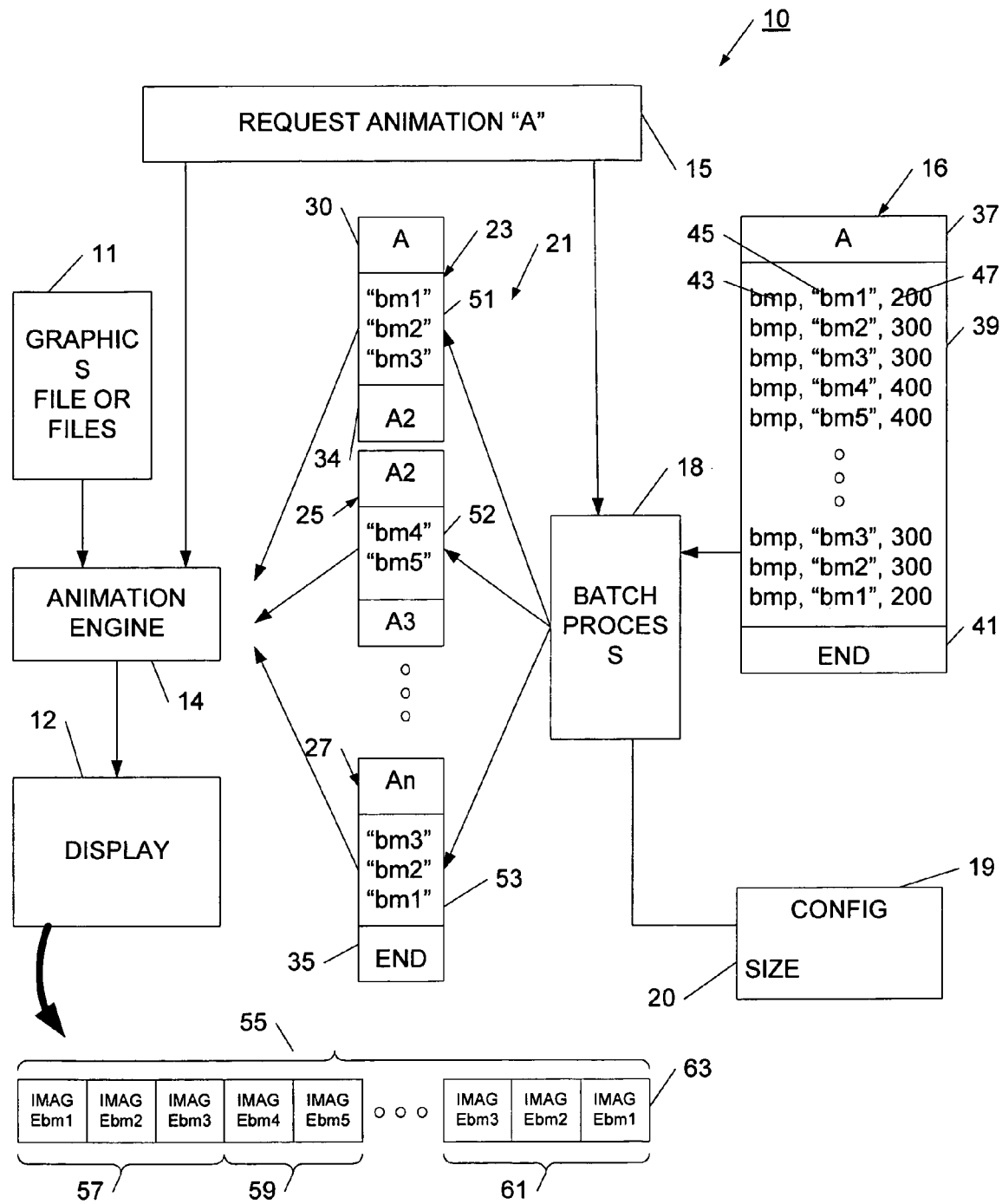
FIG. 1 is a block diagram of a system and method of displaying an animation in accordance with the present invention.

Referring now to FIG. 1, a system for sequencing media objects is shown. More particularly, the example of FIG. 1 is useful for sequencing and displaying a long animation. It will be understood that other media types may be used. The system 10 may operate, for example, on an embedded processor system and be configured to display animations on a user interface screen. In one example, system 10 operates on a mobile phone that has an embedded processor and a display screen, which is typically a black and white or color LCD. System 10 provides for displaying animations to a user on one or more display screens. The animations may be part of the man-machine interface or operating system for the embedded device. In this way, the animations may be useful for providing start-up information, menu selection, notifications, help or other instructions, and an active and lively user interface. Further, these animations provide for an aesthetically pleasing, interesting, and fun user experience. In other examples of embedded systems, system 10 may be incorporated into personal data assistants, mp3 players, DVD/CD players, appliances, cars, cameras, or other consumer devices.

Advantageously, system 10 enables the presentation of long animations. In this way, more complex and interesting animations may be presented to the user. These long animations are enabled for processor based systems, including embedded system having limited RAM and a simple processor structure. It will be appreciated that the embedded processor may be for example, a microprocessor, a computer processor, a programmable logic device, a gate array, discrete logic, or an application-specific processor system such as a base band processor for a mobile phone. It will also be understood that the embedded processor may be a single processor or may include multiple connected processors.

System 10 includes a batch processor 18 and an animation engine 14. Although the batch processor 18 and the animation engine 14 are shown as separate blocks, it will be appreciated that these functions may be performed on a single processor as well as on multiple processors. The processor, which is part of an embedded system, also has a display 12. The display 12 may be for example, an LCD display screen or other visual presentation device. The batch processor 18 also is constructed to receive an animation request 15. The animation request may be from an operating software program, a user, or an external stimulus. In the example of FIG. 1, the request 15 makes a request that a long animation entitled "A" be played and displayed.

The request for the animation 15 is received into batch processor 18. Batch processor 18 retrieves an animation file 16. The animation file 16 is associated with an animation identifier 37 which in this example is also "A". It will be appreciated in practice that the animation identifier may be included as a header or data field in the animation file, or may be the name of the animation file. For example, the animation file may be saved as a text file and therefore the name of animation file 16 would be "A.txt". The animation file 16 also includes a list of image descriptors 39. The list of image descriptors 39 identifies the set of images that when sequentially displayed, comprises the animation. In the example of FIG. 1, many images comprise the animation, although only eight are specifically identified. In a typical application for a mobile phone, it is likely that long animations will have 10 or more image frames, depending on RAM availability, image size, and color depth. It will be understood that the number of images that comprise a long animation will depend on application specific needs and resources. When displayed, each of the images will be presented on the display screen 12 in the order listed in the animation file 16.

In the illustrated animation file 16, each image descriptor includes a file identifier 45. The file identifier 45 may be for example, the file name where the image may be found. Alternatively, the file identifier may be header or another data field for the file. The image descriptors 39 may also include file format information 43. Each of the images may be stored as an individual graphics file, and may be stored using a particular graphical format. For example, images may be stored in a bit map format, a JPEG format, or other standard or proprietary graphical format. The format identifier 43 identifies, for use by the batch process 18, the stored format for the associated image. The identifiers 39 may also include an indication of file size 47. The file size indicator may for example, indicate the number the bytes or kilobytes that each image consumes in memory. Alternatively, the file size indicator 47 may be a relative number indicating a relative size of a bit map. It will be understood that other size indicators will be used. It will also be understood that the processor may be arranged to interrogate the graphics files to determine format or size.

The animation file 16 also includes an end of file indicator 41. In this way the batch processor 18 can easily identify the last image in the animation. Although animation file 16 is shown providing a list of individual image files, it will also be appreciated that the graphical image content for all the images in the animation may be stored in fewer or even a single graphical file. If a single graphical file were used, then the file identifier 45 may be used to indicate a location or position in a graphical file for locating the image. The file identifier may further include an end position or notation to assist in locating the end of that particular image. It will also be understood that different file arrangements may be used consistent with this disclosure.

The batch processor 18 retrieves that animation file 16 and extracts the format information, file identification information, and size information for each of the images of the animation. The batch process 18 may also have a configuration file 19 for setting default configurations or providing operational instructions. For example, configuration file 19 may include information regarding the maximum size 20 for an animation segment. The maximum size for any animation segment is preferably related to the amount of available RAM memory in the embedded device. This maximum size may be predefined for a class of embedded systems, particularly defined for a specific device, or may be dynamically generated responsive to current processor conditions. In the example shown in FIG. 1, the batch process operates at runtime to dynamically build animation segment files. However, it will be understood that the batch process may be performed at other times, and may even be performed on a remote device. In this case, after the animation segments are remotely built the animation segment files would be transferred to the local device and stored for later use by the animation processor.

The batch processor 18 is therefore aware of a maximum size 20 for an animation segment, and further has or can retrieve size information for each of the images in the animation. In this way, the batch process 18 may take the set of images identified in the image list 39, and segment that list into a series of subsets, where each subset has images, that in the aggregate, are smaller in size than the maximum size 20. For example, if the maximum size 20 is set to 900, then the batch process constructs a list of a first subset 51 of images starting with "bm1" and continuing until the maximum number of sequential images has been selected without exceeding a size of 900. Here, "bm1", "bm2", and "bm3" total to 800, while adding "bm4" would exceed the limit of 900. Accordingly, "bm1", "bm2", and "bm3" are segmented into a first subset of images 51. Continuing in sequence, the batch process calculates that "bm4" and "bm5" total to 800, while adding a next image (not shown) would exceed the limit of 900. Accordingly, "bm4" and "bm5" are placed in a second subset of images 52. The batch process 18 continues in this manner through other images comprising the long animation, which are not specifically identified in the animation "A". Instead, the images that are not specifically identified are indicated with ellipses. Finally, the batch process includes the last three images, "bm3", "bm2", and "bm1" in a final subset of images 53. The batch processor therefore has taken the set of images in animation file 16 and segmented them into a series of sequential subsets of images. Each of the subsets includes images that in the aggregate have a size less than a defined maximum size.

The batch processor 18 also provides an action instruction along with each of the subset of images 51, 52, and 53. This action instruction may be included as a data field in a file, or may be included as part of the file name, for example. In the example of FIG. 1, the action instruction is used in two ways. First, the action instruction may be used to link one of the subsets to the next sequential subset. In this way, the action instruction is useful to link or chain the subsets in the proper sequential order. In another use, the action identifier is used to identify the last image for the long animation. It will be appreciated that action instruction may have other uses.

Each of the subsets of images, such as the first subset 51, are assigned and associated with a file identifier, such as file identifier 30. File identifier 30 may be a file name for the subset, or may be a header or other data information embedded as data within the file. In the example of FIG. 1, the file identifier 30 for the first subset of images 51 is the same as the animation name "A". Each subsequent subset of images is a sequential variation of this name. For example, the second subset of images 52 would be identified with "A2". It will be understood that other naming and identification arrangements are well known and may be used consistent with this disclosure.

Each of the sets of images is thereby associated with a file identifier and an action instruction. The combination of the set of images, the file identifier, and the action instruction form animation segment files 21. In the example of FIG. 1, each of the segment files includes a list of filenames for identifying the images in an animation segment. However, it will be understood that the segment file alternatively could be constructed to hold the graphical information for the images as well.

As generally described above, the action instruction may be either a call back instruction 34 for linking the segment files together, or may provide an end of file indicator 35 for the final set of images 53. For each of the segment files, other than the final segment file 27, the call back instruction 34 indicates the file identifier for the next sequential segment file. For example, FIG. 1 shows that the first segment file 23 has a call back instruction 34 of "A2". This call back identifier, therefore, indicates the file identifier for the next sequential segment file. In this case, the second segment file 25 has a file identifier of "A2". In this way, the call back indicators and file identifiers act to link together the segment files in sequential order. The final subset 27 includes an action indicator 35 in the file for informing the animation engine 14 that the last image of the animation has been displayed. It will be appreciated that other ways of identifying the end of file may be used.

The animation engine 14 also received the request for animation 15. The request may be received at the same time the batch process receives the request, or may be delayed. Also, the instruction to play the animation may be generated by a source different then the source directing the batch processor. For example, one event may cause the batch processor to prepare the segment files 21, while a later event may trigger the animation engine 14 to begin displaying the animation.

The animation engine 14 waits at least until the first segment file 23 has been defined by the batch process. Depending on processor power and required response times, the animation engine may wait until the batch process 18 has completed defining all the segment files 21, or may proceed with displaying the animation prior to the completion of the batch process. It will also be appreciated that batch process 18 may be completed at a different time then when the animation is to be viewed. For example, the batch process 18 may be used to predefine the segment files 21, and to store the segment files in the local device. In another example, batch process 18 may preprocess often used animations, or animations that are expected to be used in the near future. For way of illustration, if a user is currently on a voice telephone call, the batch processor may pre-prepare an animation that will be displayed when the user ends the call. In this way, the segment files are available for immediate use by the animation engine as soon as the user disconnects the call. It will be understood that many timing relationships between the batch process and the animation engine may be used consistent with this disclosure.

The animation engine retrieves the first segment file 23 using the file identifier 30 for the first segment file. The animation engine extracts the file names for all the images in that animation segment. The animation engine extracts the associated images from a graphics file or files 11. Since the images in the segment file were selected to be less than a maximum size, all images in a segment may be loaded into memory concurrently. In the example of FIG. 1, the animation engine would first load "bm1", "bm2", and "bm3" into memory. After the images are loaded, the animation engine 14 sequentially displays "bm1", "bm2", and "bm3" as the first three frames in an animation. More particularly, the animation engine 14 displays each of the animations for a period of time, for example 200 milliseconds, and then display the next image. The animation engine 14 also extracts the call back information 34 from the first segment file 23. In this way, the animation engine 14 is aware of which segment file to access next. For example, in FIG. 1 the call back instruction in the first segment file is "A2". Accordingly, the animation engine proceeds to locate and retrieve the segment file having a file identifier of "A2". The animation engine 14 then loads the image files identified in the second segment, which are "bm4" and "bm5", and proceeds to sequentially display those images. The animation engine continues in this way until all images have been sequentially displayed and the end indicator 35 has been found in the final segment file 27.

The user therefore sees the display 12 show an entire long animation 55. The long animation 55 may be substantially longer than a typical animation played from an embedded system. The animation 55, which may be many images or frames 63 in length, actually is comprised of several sequential animation segments. For example, long animation 55 has a first animation segment 57 which was displayed responsive to the first segment file 23, a second animation segment 59, which was displayed responsive to the second segment file 25, and a final animation segment 61, which was displayed responsive to the final segment file 27. Due to the relatively low frame rate used for animations in embedded systems, the animation segments combine to form the long animation 55 with little or no human perceivable delay or interruption.

Figure 2:
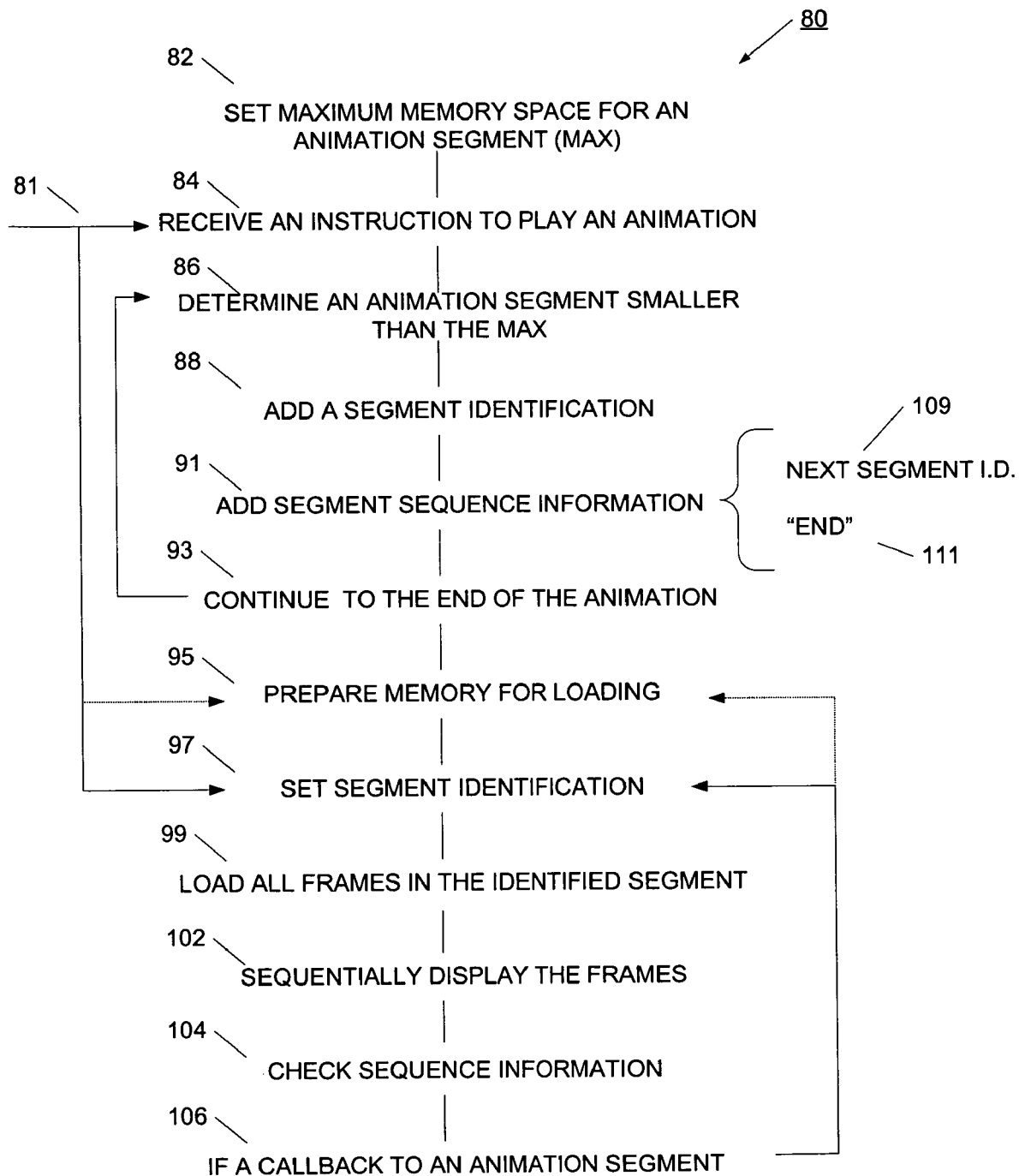
FIG. 2 is a flowchart of a method of displaying an animation in accordance with the present invention.

Referring now to FIG. 2 a method of displaying an animation is illustrated. Method 80 may be used on an embedded system for displaying long animations as part of a user interface or user display system. The animations provide a desirable, interesting and aesthetically pleasing appearance, and may increase the amount of information effectively communicated to a user. Method 80 sets a maximum memory space for an animation segment as shown in block 82. The maximum size may be set dynamically by the embedded system according to current processor and memory condition, or may be predefined for a specific device or model of device. The size may be set to a particular byte or kilobyte memory size, or may be set to a particular number of images.

A command 81 may be received to instruct the embedded processor or animation engine to play an animation as shown in block 84. In order to efficiently play a long animation, the long animation is segmented into a series of sequential animation segments, with each of the animation segments having images that aggregate to a amount less than the maximum segment size, as shown in block 86. A segment file is constructed for representing each animation segment, with the segment file including an identification of the images for that animation's segment. A segment identification 88 is provided along with the identification of the images in a segment file. The segment identification may be for example, the name of the segment file, or may be data embedded within the segment file.

The segment file also includes segment sequence information 91. The segment sequence information may be in the form of an instruction in the segment file. For example, the instruction may indicate the segment identification 109 for the next sequential segment file. For the final segment of the animation, the instruction may include an end of file 111 indication. Method 80 segments the long animation into as many animation segments as necessary as shown in block 93.

The embedded system, responsive to receiving the instruction for playing animation, may prepare its memory 95 for loading images or frames. For example, the embedded processor may need to clear certain areas of the memory, or may rearrange its memory to make larger blocks of memory available. In block 97, the segment file identification is set. When first starting the animation, the segment identification is initially set to the file identifier for the first segment file. In this way, all the frames identified in the first segment file are then loaded into memory as shown in block 99. The embedded processor or animation engine then continues to sequentially display all the loaded frames as shown in block 102. The animation engine also checks the sequence information 104 in the segment file, which may be in the form of an action instruction or a callback. This sequence information may indicate whether there is a next segment file or if the end of file has been reached. If a next segment is indicated, the sequence information provides the segment identification for the next segment 106. That identification is then used to set the next segment identification in block 97. In this way, a segment file links to the next sequential segment file. The process of loading and displaying frames continues until all segment files have been used and the end of file instruction found.

Figure 3:
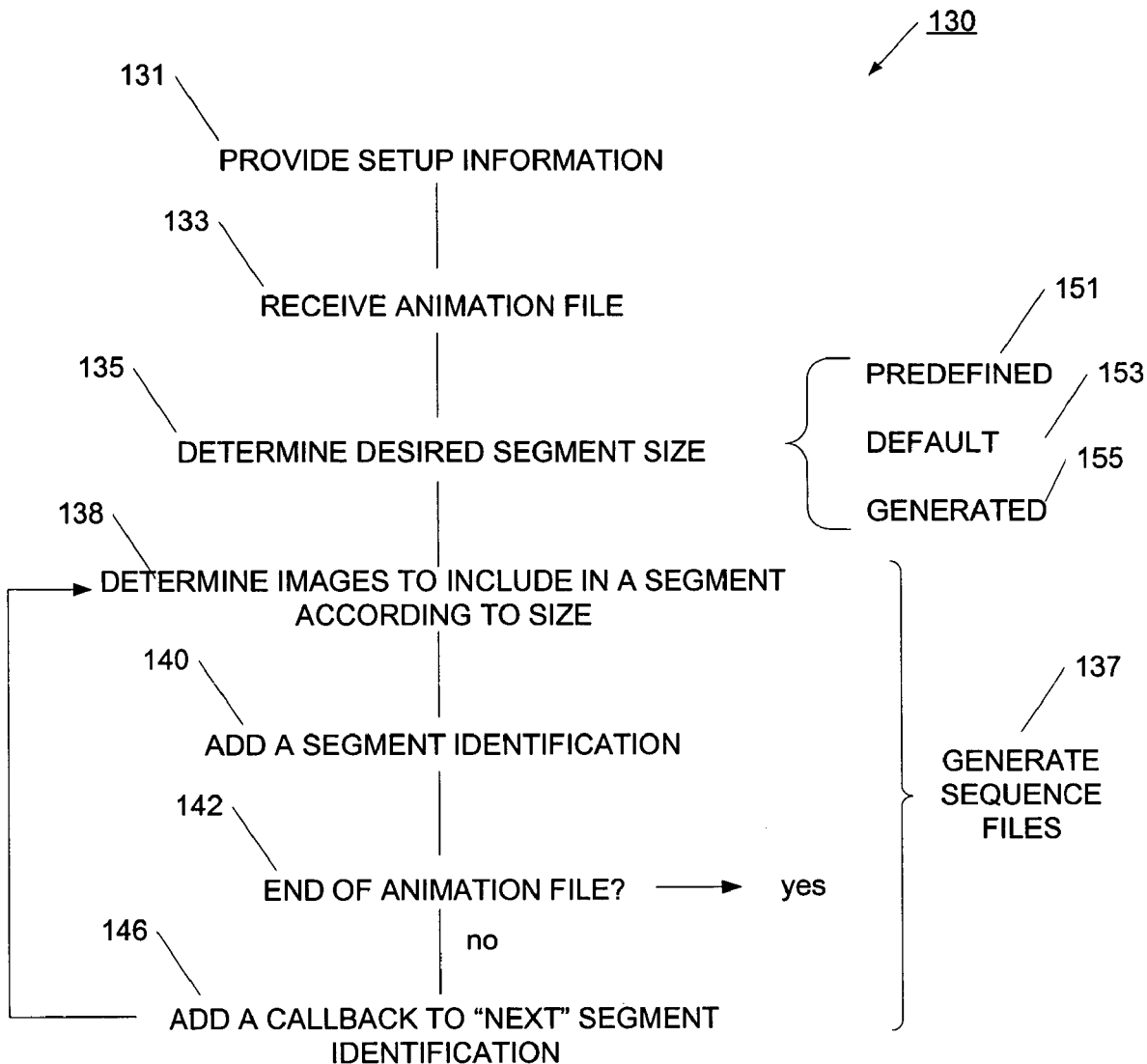
FIG. 3 is a flowchart of method for generating animation segment files in accordance with the present invention.

Referring now to FIG. 3 a method for generating animation segment files 130 is shown. Method 130 provides set up information 131 for an embedded processor. The set up information may include for example, a maximum size indicator. This maximum size indicator may be set for a particular memory size, number of frames, number of available blocks, or other indications of particular or relative size. Method 130 then receives an animation file 133. The animation file indicates a set of ordered images that are to be displayed in the animation. Preferably, the animation file also includes information regarding file format and the size of each image. Method 130 then determines the desired animation segment size as shown in block 135. The segment size may be predefined 151, for example, in the set up information 131, may be provided as a default size 153, or may be generated 155 responsive to processor and memory conditions.

The method 130 then proceeds to generate 137 a series of sequential segment files. With the segment size determined, the method 130 is able to determine animation segments according to the maximum size, as shown in block 138. It will also be appreciated that the maximum size may include some flexibility to allow a particular animation segment to exceed the exact maximum size. Such flexibility could allow for increased efficiency for some embedded systems. Method 130 adds a segment identification 140 to the list of image files. For example, the segment identification may be a file name for the segment file, or may be header or other data information stored within or otherwise associated with the file. If the segment file is not the last segment file, a call back instruction is added to the segment file as shown in block 146. This call back instruction is used to indicate the file identifier for the next segment file in the sequence. If the current segment represents the final segment file as shown in block 142, then an end of file indicator is added to the file.

Method 130 thereby accepts a long animation file, and segments the set of images identified in the animation file into a series of sequential subsets. Each of the subset of images is associated with a file identifier and an instruction, thereby forming respective segment files. The instruction is used to link the segment files into proper sequence without the use of a master controlling program. In this way, the application and required processor structure is simplified. It will be appreciated that method 130 may be performed prior to the time a request to play an animation has been received, or may be contemporaneous with such requests.

Figure 4:
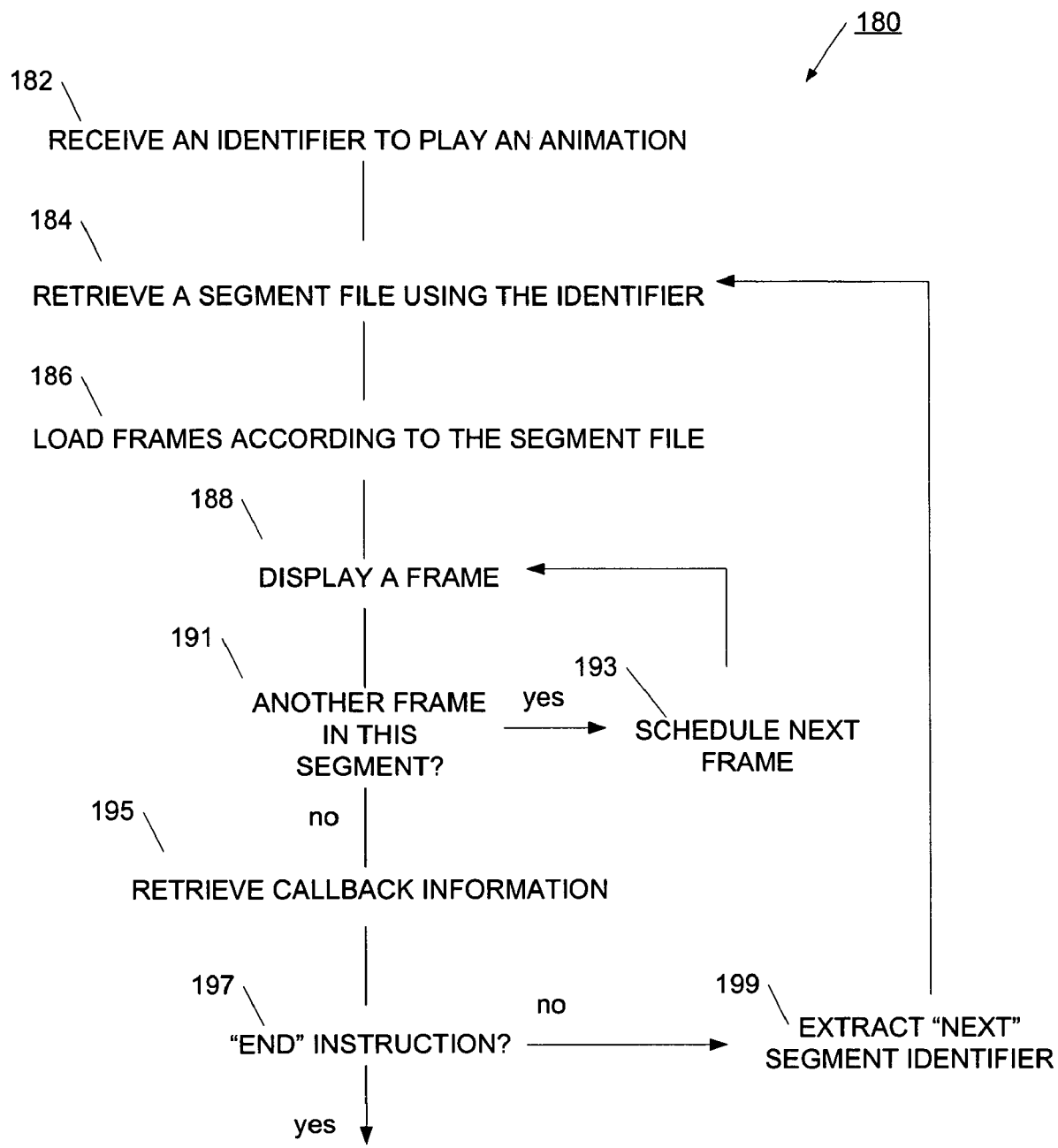
FIG. 4 is a flowchart of a method for displaying animation segments in accordance with the present invention.

Referring now to FIG. 4 a method for displaying animation segments is illustrated. Method 180 uses a series of sequential animation segment files, for example, animation segment files generated according to method 130. Method 180 receives an instruction to play an animation, with the instruction providing the file identifier for the first animation segment file as shown in block 182. Method 180 then retrieves 184 an animation segment file using the first file identifier. The first animation segment file includes an identification of a first subset of images or frames. Method 180 then loads these frames or images as shown in block 186. Each frame is displayed as shown in block 188, and if there is another frame identified for the segment 191, then the next sequential frame is scheduled 193. If there are no more frames identified in the segment, then an instruction is retrieved from the segment file as shown in block 195. If the instruction is an action command indicating the animation has ended, then method 180 ends displaying the animation. However, the instruction may also be a callback that indicates the identifier for the next segment file as shown in block 199. In this case, the next segment file identifier is extracted and used to retrieve the next animation segment file as shown in block 184. This process of loading, displaying, and linking to the next segment file is continued until the end instruction is found in block 197.

Figure 5:
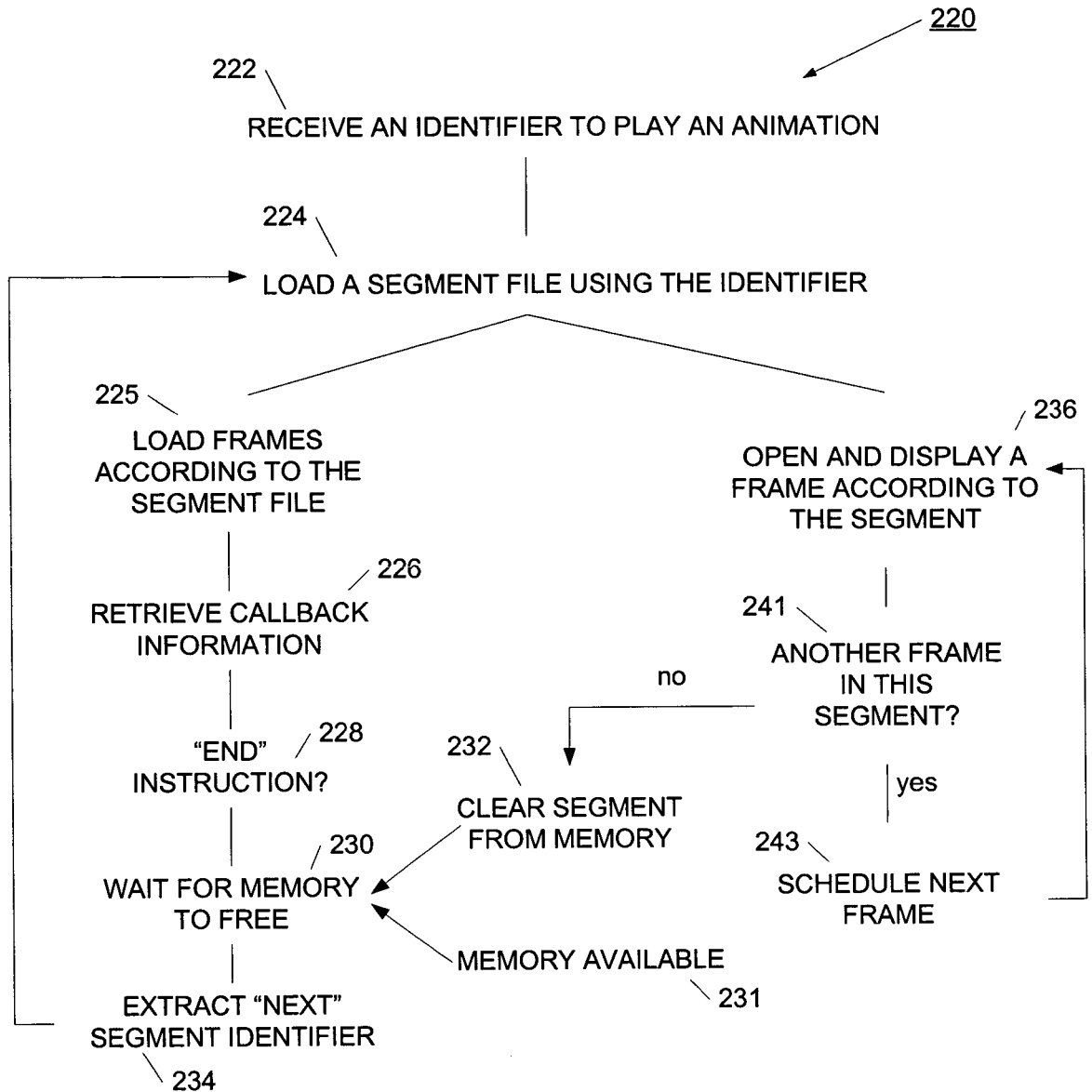
FIG. 5 is a flowchart of a method for displaying animation segments in accordance with the present invention.

Referring now to FIG. 5, an alternative implementation for a method for displaying animation segments is illustrated. Method 220 loads a segment file using the identifier received in block 222. As shown in block 225, the frames identified in the segment file are then loaded into memory. In block 236, each frame is displayed according to its sequence in the segment file. If there is another frame in the segment 241 then a next frame is scheduled 243 and displayed according to that schedule in block 236. For example, frames may be scheduled to be displayed every 200 milliseconds. After the last frame has been displayed, the subset of images associated with the shown animation segment may be cleared from memory 232.

Contemporaneous with the displaying process shown in blocks 236, 241, and 243, the method 220 may also monitor and manipulate memory usage. For example, method 220 retrieves instruction information from each segment file as shown in block 226. The instruction may be an end instruction 228 indicating the last segment file. If the instruction is not the end indicator, then the process 220 is aware that another segment file needs to accessed, and its associated image files loaded into memory. Method 220 may wait 230 for an indication that sufficient memory is free to load the image files in the next animation segment. For example, this indication may occur when the images from the current animation segment have been deleted from memory as shown in block 232. It will also be understood that the method 220 may otherwise identify free memory and proceed to loading the next subset of frames. As way of illustration, a memory manger in the embedded system may provide an indication that sufficient memory is available 231 to load the next set of images. In this way, the next subset of images may be loaded before the final image in the previous subset has been displayed.

When memory is available, process 220 uses the call back information in the current segment file to identify the next segment file 234 in sequence. The next segment file is loaded using the next identifier as shown in block 224, and the frames identified in the next segment file are then loaded into memory as shown in block 225. In this way, method 220 enables the display of images from a current subset of images, contemporaneous with the loading of a next subset of images.

Figure 6:
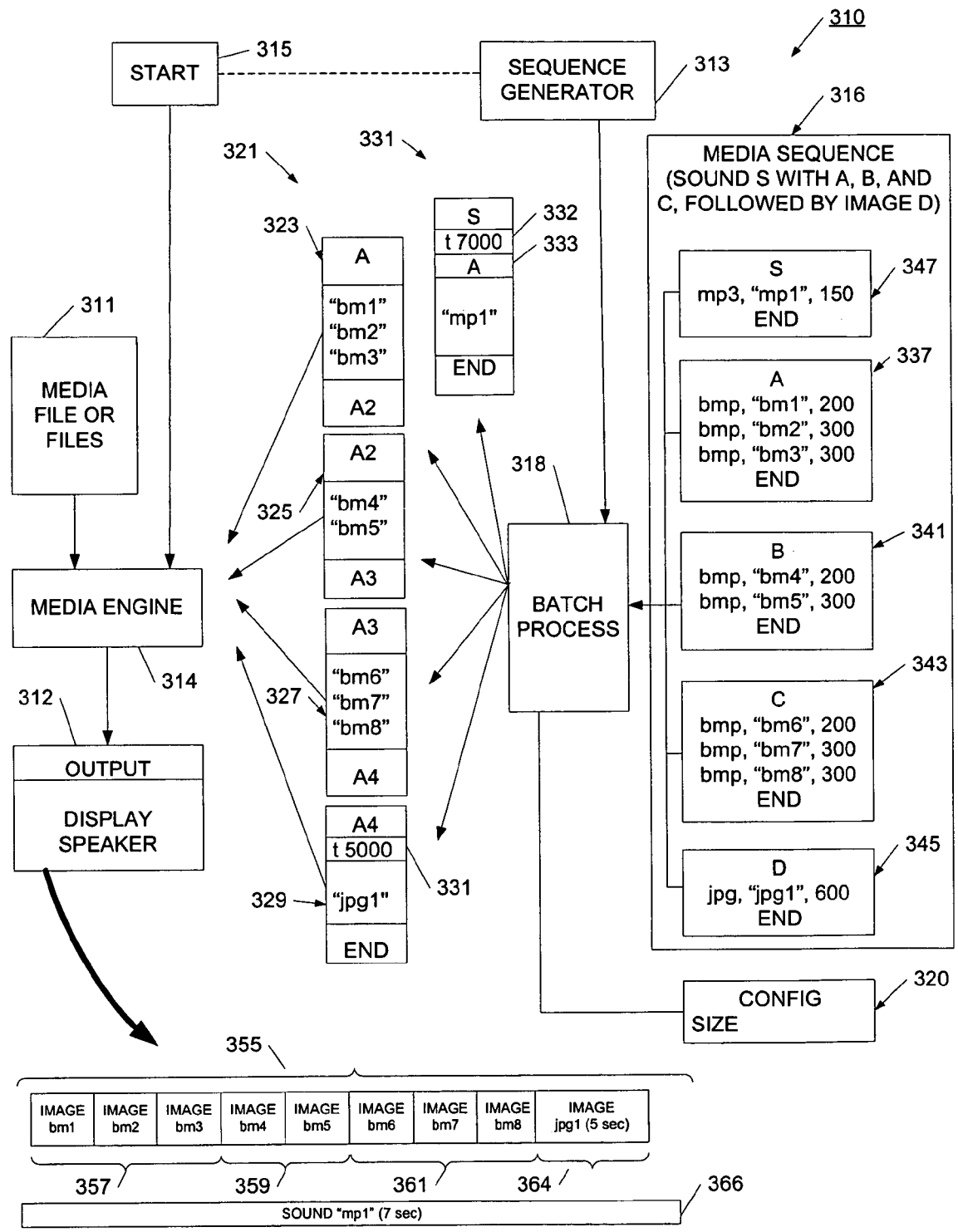
FIG. 6 is a block diagram of a system and method of sequencing multimedia objects in accordance with the present invention.

Referring now to FIG. 6, a system and method for sequencing multimedia objects is shown. System 310 is similar to system 10 described with reference to FIG. 1, but is illustrated sequencing and using other types of media, such as sound and static images. In system 310, a media file 316 is used to define the overall sequence for the media objects. This media file 316 may be predefined, or may be generated dynamically responsive to specific conditions. For example, the media file 316 may be defined to play a particular sequence of sounds, images, and animations upon startup, or the sequence may be defined dynamically responsive to a particular condition, such as battery strength or network availability. In this way, the media sequence may present specific information to a user about current conditions.

FIG. 6 illustrates an optional sequence generator 313 that may dynamically determine which media objects to present, the order to present them, the duration of presentation, and other characteristics of the multimedia presentation. The sequence generator 313 may be, for example, an application operating on the embedded processor or other computing device, or may be discrete sensing devices for setting flags or other indicators in an application program.

The media file 316 of FIG. 6 indicates that a sound 347 is started with the sound file "mp1", which is an MP3 file. Next, animations 337, 341, and 343 should be played in order of "A" followed by "B" followed by "C". The animation sequences are followed by an image 345. Each of the media files 337, 341, 343, 345, and 347 may also include timing information. For example, the sound media file 347 may include an instruction for how long to play the sound, or how many times to repeat the sound file. In a similar manner, each of the animation media files could include timing information on how long to display each image. Also, the image media file 345 could include duration information on how long to display the image on the display screen.

A batch processor 318 accepts the media file 316 and generates media segment files 321. These segment files have been sized according the configuration 320. For example, long animation segments may be segmented into animation segments such that all the images for a segment may be concurrently loaded into memory. It will be understood that the configuration 320 may be predefined, or may be dynamically adjusted according to current conditions. Also, because the media file may instruct that certain medial objects be concurrently loaded, the segment file size may need to be adjusted. For example, if a sound file of 50 kbytes is to played at the same time a long animation is to be presented, then the maximum size of each segment file should be adjusted to account for the 50 k sound file being resident in memory.

The media engine 314 then uses the media segments 321 to present a complete multimedia presentation. The media engine 314 accesses a media file or files 311 to load the specific media files needed for each segment. The media engine 314, upon having a start 315 indication, accesses the "S" sound file. The sound segment 331 includes a file identifier "S" and a final action command "END". Additionally, the sound segment file includes another action instruction 332 to indicate how long the sound file is to be played. Here, action command 332 indicates that sound file "mp1" is to play for 7 seconds. Sound segment 332 also includes another action instruction 333, which instructs the media engine 314 to concurrently load and play another media object. Here, sound segment 331 has the action instruction "A" 333, which caused the media engine to access the "A" animation segment 323, and proceed to load and play its associated images. In this way, sound is played while the animation is played. It will be understood that other methods may be used to implement action commands for indicating timing, repetition, or duration consistent with this disclosure. In use, the sound file would be loaded into memory and played, the animation started, and the sound ended after 7 seconds of play. Since the final action command in the sound segment is "END", no other media file would be loaded responsive to ending the "S" sound file.

After the media engine 314 starts the sound file, the media engine 314 starts the animation segment 323 and sequentially displays its three image files, and then uses the action command "A2" to callback animation segment 325. After the media engine 314 sequentially displays the two images of animation segment 325, it uses the callback "A3" to sequence animation segment 327. Animation segment file 327 in a similar manner has "A4" to callback image segment 329. Image segment 329 includes a timing action instruction 331 for setting the duration that the image "jpg1" will be displayed. Here, the media engine 314 displays the image "jpg1" for 5 seconds, and then the "END" action instruction indicates that "A4" does not callback any other media segment.

The animation engine presents the multimedia presentation on user output devices 312, which may include a display for images and animations, and a speaker for sound. The multimedia presentation 355 (not shown to scale) is shown to the user, and consists of the playing of a sound 366, which is followed by showing animation segments 357, 359, and 361 according to segment files 323, 325, and 327, respectively. After animation segment 361 completes, image 364 is displayed for 5 seconds. Depending on the timing for the animations, the sound may play for a short time after the image has ended. It will be understood that the sound file may have included an action instruction arranged to cause the sound file to end before or concurrent with the end of the image.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method for displaying an animation on a mobile phone having a processor, a memory and a display screen, comprising:
    enabling the processor to perform as a batch processor and as an animation engine;
    receiving an instruction to display an animation file on the mobile phone, the animation file comprising,
        a plurality of images ordered for sequential display,
        a file identifier that indicates a file name for each image,
        a file format descriptor that indicates the stored format for each image,
        a file size indicator that provides a file size for each image;
    retrieving the animation file responsive to the instruction with the batch processor, wherein the batch processor extracts the file identifier for each image, the file format descriptor for each image, and the file size indicator for each image;
    predetermining a maximum memory size based on the memory corresponding to the mobile phone, the maximum memory size corresponding to a maximum amount of memory usable to load each set of images;
    generating a first set of images with the batch processor, in which the file size of each image aggregates to a size up to the predetermined maximum memory size, the first set of images having a file identifier and a final image;
    generating a second set of the images with the batch processor, in which the file size of each image aggregates to a size up to the predetermined maximum memory size, the images in the second set being in sequence behind the final image;
    associating a callback identifier with the second set of images;
    providing the callback identifier along with the first set of images;
    loading the first set of images into the memory readable by the animation engine;
    displaying sequentially, using the image order in the animation file, each image in the first set of images;
    retrieving the callback identifier provided with the first set of images;
    using the callback identifier to load the second set of images into the memory; and
    displaying sequentially, using the image order in the animation file, each image in the second set of images.

2. The method for displaying an animation according to claim 1, wherein each of the images are stored as individual graphics files.

3. The method for displaying an animation according to claim 1, wherein the maximum size is set to further correspond to a number of images.

4. The method for displaying an animation according to claim 1, wherein the maximum size is set at a predetermined memory size for an embedded system.

5. The method for displaying an animation according to claim 1, wherein the maximum size is generated responsive to an inquiry regarding available memory.

6. The method for displaying an animation according to claim 1 wherein the associating step includes using the callback identifier as a name for the second set of images.

7. The method for displaying an animation according to claim 1 wherein the associating step includes placing the callback identifier as data in the second set of images.

8. The method for displaying an animation according to claim 1 wherein providing the callback identifier includes using the callback identifier as part of a name for the first set of images.

9. The method for displaying an animation according to claim 1 wherein providing the callback identifier includes placing the callback identifier as data in the first set of images.

10. The method for displaying an animation according to claim 1 wherein the second set of images are being loaded into the animation processor while the images in the first set are being displayed.

11. A method of generating animation segment files on a mobile phone having a processor, a memory and display screen, comprising:
    enabling the processor to perform as a batch processor and as an animation engine;
    receiving an animation file for the mobile phone, wherein the animation file comprises
        a plurality of images ordered for sequential display,
        a file identifier that indicates a file name for each image,
        a file format descriptor that indicates the stored format for each image,
        a file size indicator that provides a file size for each image;
    retrieving the animation file responsive to an instruction with the batch processor, wherein the batch processor extracts the file identifier for each image, the file format descriptor for each image, and the file size indicator for each image predetermining a maximum memory size based on the memory corresponding to the mobile phone, the maximum memory size corresponding to a maximum amount of memory usable to load each set of images;

dividing the set of images into sequential subsets of images with the batch processor, in which the file size of each image aggregates to size up to the maximum memory size, wherein each subset of images includes the file identifier for each image and each image is ordered consistent with the animation file;

associating a subset identifier with each respective subset of images;

associating an action instruction with each respective subset of images;

wherein the action instruction associated with one subset identifies another one of the subsets; and displaying sequentially each image in the subset of images consistent with the animation file.

12. The method of generating animation segment files according to claim 11, wherein the maximum size further corresponds to a number of images of known size.

13. The method of generating animation segment files according to claim 11, wherein the maximum size is set to a memory size derived from an amount currently usable for loading images.

14. The method of generating animation segment files according to claim 11, wherein an action instruction is used to identify the last subset.

15. A method of displaying an animation on a mobile phone having a processor, a memory and a display screen, comprising:

causing the processor to perform as a batch processor and as an animation engine;

receiving an instruction to display the animation file on the mobile phone, the animation file comprising
a set of sequential images,
a file identifier that indicates a file name for each image,
a file format descriptor that indicates the stored format for each image,
a file size indicator that provides a file size for each image;

retrieving the animation file responsive to the instruction with the batch processor, wherein the batch processor extracts the file identifier for each image, the file format descriptor for each image, and the file size indicator for each image;

predetermining a maximum memory size for each segment file based on the memory corresponding to the mobile phone, the maximum memory size corresponding to a maximum amount of memory usable to load images for each segment file;

generating a first segment file with the batch processor, the first segment file configured to aggregate to a size up to the predetermined maximum memory size based on the file size of each image, the first segment file having a final image;

generating a second segment file with the batch processor, the second segment file configured to aggregate up to the predetermined maximum memory size based on the file size of each image, the second segment file being in sequence behind the final image;

retrieving the first segment file with the animation engine, the first segment file identifying a first subset of the images;

loading the first subset of images into the memory and sequentially displaying the images in the first subset of images;

extracting a callback instruction associated with the first segment file with the animation engine, the callback instruction identifying the second segment file;

releasing the memory holding at least one of the images in the first subset of images;

retrieving the second segment file with the animation engine, the second segment file identifying a second subset of the images; and loading the second subset of images into the memory and sequentially displaying the images in the second subset of images.

16. The method of displaying an animation according to claim 15, wherein loading the second subset is initiated before all the images in the first subset have been displayed.

* * * * *